United States Patent
Richardson et al.

(10) Patent No.: US 9,110,580 B2
(45) Date of Patent: Aug. 18, 2015

(54) APPARATUS COMPRISING A DISPLAY AND A METHOD AND COMPUTER PROGRAM

(75) Inventors: Nigel Richardson, Surrey (GB); Brian Davidson, Surrey (GB); John Cattermole, Buckinghamshire (GB)

(73) Assignee: Nokia Technologies Oy, Espoo (FI)

( * ) Notice: Subject to any disclaimer, the term of this patent is extended or adjusted under 35 U.S.C. 154(b) by 167 days.

(21) Appl. No.: 13/198,921

(22) Filed: Aug. 5, 2011

(65) Prior Publication Data

US 2013/0033434 A1 Feb. 7, 2013

(51) Int. Cl.
G06F 3/0488 (2013.01)
G06F 1/16 (2006.01)
G06F 3/0483 (2013.01)
G06F 3/03 (2006.01)

(52) U.S. Cl.
CPC .......... *G06F 3/0488* (2013.01); *G06F 1/1626* (2013.01); *G06F 1/1637* (2013.01); *G06F 1/1652* (2013.01); *G06F 3/0483* (2013.01); *G06F 3/04883* (2013.01); *G06F 3/04886* (2013.01); *G06F 3/03* (2013.01); *G09G 2300/02* (2013.01)

(58) Field of Classification Search
CPC ...... G09G 5/00; G09G 2300/02; G06F 3/041; G06F 3/04883; G06F 3/04886
See application file for complete search history.

(56) References Cited

U.S. PATENT DOCUMENTS

| | | | |
|---|---|---|---|
| 5,295,522 A | 3/1994 | DeAngelis et al. | 141/98 |
| 6,747,713 B1 | 6/2004 | Sato | 349/58 |
| 6,771,237 B1 * | 8/2004 | Kalt | 345/85 |
| 8,502,788 B2 | 8/2013 | Cho et al. | 345/173 |
| 2002/0042285 A1 | 4/2002 | Sakata et al. | 455/550 |
| 2003/0111366 A1 | 6/2003 | Enners | 206/305 |
| 2006/0197750 A1 | 9/2006 | Kerr et al. | 345/173 |
| 2006/0268528 A1 | 11/2006 | Zadesky et al. | 361/728 |
| 2007/0261978 A1 | 11/2007 | Sanderson | 206/320 |
| 2007/0290999 A1 * | 12/2007 | Cho et al. | 345/158 |
| 2008/0227507 A1 | 9/2008 | Joo | 455/575.8 |
| 2009/0036208 A1 * | 2/2009 | Pennington et al. | 463/33 |
| 2009/0164035 A1 | 6/2009 | Zadesky et al. | 700/94 |
| 2009/0185344 A1 | 7/2009 | Zadesky et al. | 361/679.56 |
| 2009/0312063 A1 | 12/2009 | Soto Nicolas | 455/566 |
| 2010/0038107 A1 | 2/2010 | Su et al. | 174/50 |
| 2010/0053861 A1 | 3/2010 | Kim et al. | 361/679.01 |
| 2010/0117975 A1 | 5/2010 | Cho | 345/173 |
| 2010/0156887 A1 | 6/2010 | Lindroos et al. | 345/418 |
| 2010/0164973 A1 | 7/2010 | Huitema et al. | 345/581 |
| 2010/0253902 A1 | 10/2010 | Yamazaki et al. | 349/158 |
| 2011/0151935 A1 | 6/2011 | Oksman et al. | 455/566 |
| 2012/0096373 A1 * | 4/2012 | Aguera Y Arcas et al. | 715/764 |
| 2012/0235893 A1 * | 9/2012 | Phillips et al. | 345/156 |

FOREIGN PATENT DOCUMENTS

| | | |
|---|---|---|
| CN | 1893786 A | 1/2007 |
| EP | 0 878 942 A2 | 11/1998 |
| EP | 1 313 296 A2 | 5/2003 |

(Continued)

*Primary Examiner* — Sahlu Okebato
(74) *Attorney, Agent, or Firm* — Harrington & Smith (57) ABSTRACT

An apparatus including: a display including a central portion and a curved side portion; a memory storing pages of content; and a display controller configured to control simultaneously the central portion of the display to display at least a portion of a first page of content and the curved side portion of the display to display additional information not forming part of the first page of content.

20 Claims, 4 Drawing Sheets

(56) References Cited

FOREIGN PATENT DOCUMENTS

| KR | 20-0194785 | 9/2000 |
| KR | 20000058043 A | 9/2000 |
| KR | 10-2008-0084494 A | 9/2008 |
| KR | 10-0934120 | 12/2009 |
| KR | 10-2010-0027546 A | 3/2010 |
| KR | 20100052227 A | 5/2010 |
| WO | WO-2007/053368 A2 | 5/2007 |

* cited by examiner

APPARATUS COMPRISING A DISPLAY AND A METHOD AND COMPUTER PROGRAM

TECHNOLOGICAL FIELD

Embodiments of the present invention relate to an apparatus comprising a display. In particular, they relate to an apparatus comprising a display that has a curved side portion.

BACKGROUND

It is now common for electronic apparatus to have a display as part of their user interface. A display can be used to provide content to a user. This content may, for example, be information content for consumption by a user or control content that enables a user to control the apparatus.

It is also now possible to combine input and output functions at a display by using a touch sensitive display. Such a display enables a user to control the apparatus by touching the display.

BRIEF SUMMARY

According to various, but not necessarily all, embodiments of the invention there is provided an apparatus comprising: a display comprising a central portion and a curved side portion; a memory storing pages of content; and a display controller configured to control simultaneously the central portion of the display to display at least a portion of a first page of content and the curved side portion of the display to display additional information not forming part of the first page of content.

According to various, but not necessarily all, embodiments of the invention there is provided a method comprising: controlling a central portion of a display to display at least a portion of a first page of content; and controlling a curved side portion of the display to display, simultaneously, additional information not forming part of the first page of content.

According to various, but not necessarily all, embodiments of the invention there is provided an apparatus comprising: at least one processor; and at least one memory including computer program code the at least one memory and the computer program code configured to, with the at least one processor, cause the apparatus at least to perform: controlling a central portion of a display to display at least a portion of a first page of content; and controlling a curved side portion of the display to display, simultaneously, additional information not forming part of the first page of content.

According to various, but not necessarily all, embodiments of the invention there is provided a display controller configured to control simultaneously a central portion of a display to display first content and a curved side portion of the display to display additional information not forming part of the first content.

BRIEF DESCRIPTION

For a better understanding of various examples of embodiments of the present invention reference will now be made by way of example only to the accompanying drawings in which.

DETAILED DESCRIPTION

The Figures schematically illustrate an apparatus 10 comprising:

a display 12 comprising a central portion 14 and a curved side portion 16, 16A, 16B; a memory 24 storing pages 40 of content 26; and a display controller 20 configured to control simultaneously the central portion 14 of the display 12 to display at least a portion of a first page $40_N$ of content 26 and the curved side portion 16A of the display 12 to display additional information $40A_{N+1}$ not forming part of the first page $40_N$ of content 26.

The curved side portion 16A of the display 12 may provide a preview screen that previews content configured to follow content displayed in the central portion 14 of the display 12.

Figure 1:
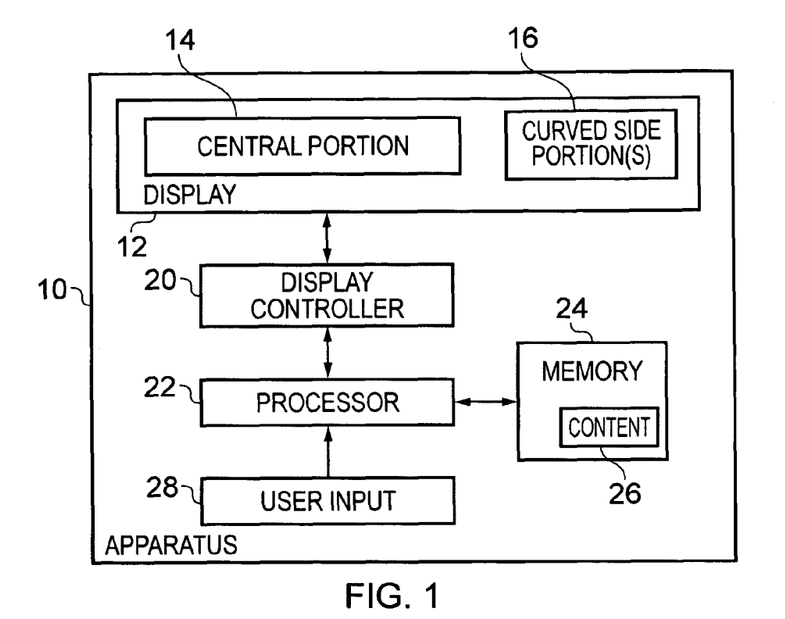
FIG. 1 schematically illustrates an example of an apparatus configured to display content to a user of the apparatus.

FIG. 1 schematically illustrates an example of an apparatus 10 configured to display content 26 to a user of the apparatus 10.

The apparatus 10 may be a portable electronic device. It may, for example, be hand-portable that is, having dimensions that enable the apparatus to be supported on a palm of one hand. This size also enables the apparatus to be carried easily within a user's apparel such as a shirt or jacket pocket of a small hand-bag. The apparatus 10 may have functionality not described. It may for example be a personal electronic storage device (local storage and/or remote storage) and/or a personal media (e.g. sound and/or photographs and/or video) recorder and/or a personal media player and/or a communications device (e.g. mobile cellular network and/or wireless local area network and/or Ethernet and/or Bluetooth etc).

The apparatus 10 comprises a display 12 which is controlled by a display controller 20 to display content 26. In this example, the content 26 is read from a memory 24 by a processor 22 and then provided to the display controller 20.

The display 12 comprises a central portion 14 and at least a curved side portion 16. One example of such a display is illustrated in FIGS. 2A and 2B.

Figure 2A:
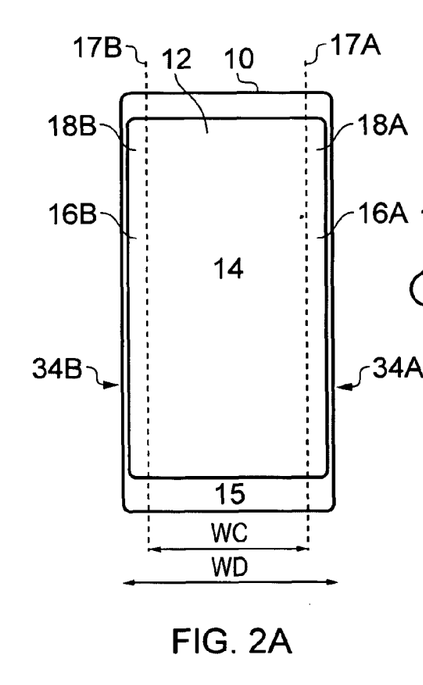
FIGS. 2A and 2B schematically illustrates an example of an apparatus configured to display content to a user of the apparatus, in plan view and in perspective view.
Figure 2B:
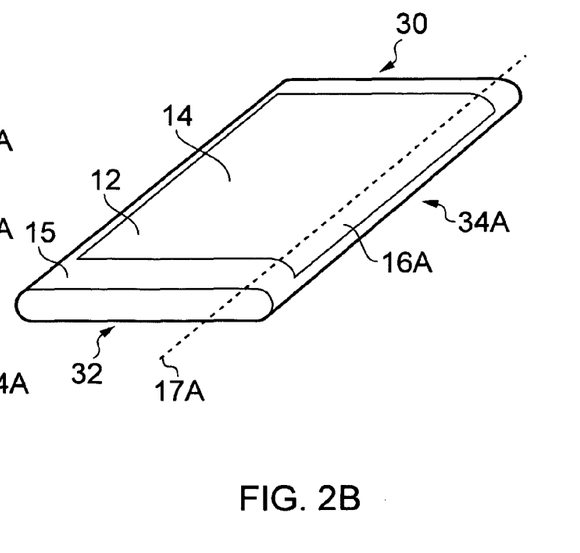

FIGS. 2A and 2B schematically illustrates an example of an apparatus 10 configured to display content to a user of the apparatus 10, in plan view and in perspective view respectively.

The apparatus 10 comprises a housing 15 that supports a display 12. The apparatus 10 has a front face 30, a left-side face 34B, a right-side face 34A and a rear face 32.

The display 12 comprises a central portion 14 at the front face 30, a right-side curved side portions 16A at the right-side face 34A and a left-side curved side portions 16B at the left-side face 34B.

The right-side curved side portion 16A of the display 12 forms at least part of the right-side face 34A of the apparatus 10. The left-side curved side portion 16B of the display 12 forms at least part of the left-side face 34B of the apparatus 10.

The curved side portions 16A, 16B are significantly more curved than the central portion 14, which in this example is flat.

A virtual line 17A separates the central portion 14 of the display 12 from the right side curved portion 16A of the display 12. The virtual line 17A runs the length of the apparatus 10 and is parallel to the side faces 34A, 34B. A virtual line 17B separates the central portion 14 of the display 12 from the left side curved portion 16B of the display 12. The virtual line 17B runs the length of the apparatus 10 and is parallel to the side faces 34A, 34B and the virtual line 17A.

The curvature of the sides of the apparatus 10 is in this example variable. For example, the right-side starts to curve at the dashed line 17A. Initially the radius of curvature is large, but it decreases rapidly as one moves along the surface of the apparatus 10 from the front face 30 to the right-side face 34A and then increases again as one moves along the surface of the apparatus 10 from the right-side face 34A towards the back face 32. This creates a curved or rounded right-side face 34A for the apparatus 10. The left-side of the apparatus 10 similarly curves so that the apparatus 10 is left-right symmetric.

The curved side portion 16A of the display 12 follows the curved surface of the apparatus 10. For example, the right-side curved portion 16A starts to curve at the dashed line 17A. Initially the radius of curvature is large, but it decreases rapidly as one moves along the left-side curved portion 16A towards the right-side face 34A. The curved portion 16A of the display 12 between the line 17A where curvature starts and the rightmost extent of the display 12 defines an elongate display strip 18A. The elongate display strip 18A has a length and the curvature of the left-side curved portion 16A is substantially constant along the whole or a majority of that length.

The curved side portion 16B of the display 12 follows the curved surface of the apparatus 10. For example, the left-side curved portion starts to curve at the dashed line 17B. Initially the radius of curvature is large, but it decreases rapidly as one moves along the left-side curved portion 16B towards the left-side face 34B. The left-side curved portion 16B of the display 12 between the line 17B where curvature starts and the leftmost extent of the display 12 defines an elongate display strip 18B. The elongate display strip 18B has a length and the curvature of left-side curved portion 16B is substantially constant along the whole or a majority of that length.

The display 12 may be a flexible display. In this case, the curved side portion 16A, 16B of the display 12 may be formed by flexing the flexible display and retaining the display 12 in a flexed state.

In the illustrated example, the curved side portions 16A, 16B of the display 12 curve over the respective edges of the apparatus 10.

In other embodiments, not illustrated, the curved side portions of the display may curve beyond the respective edges of the apparatus 10 onto the rear face 32 of the apparatus 10.

Referring back to FIG. 1, the display controller 20 is configured to control simultaneously the central portion 14 of the display 12 to display at least a portion of a first page of content and the curved side portion 16A of the display 12 to display additional information not forming part of the first page of content.

The curved side portion 16A of the display 12 may provide an elongate preview screen 18A that previews content configured to follow content displayed in the central portion 14 of the display 12.

Figure 3:
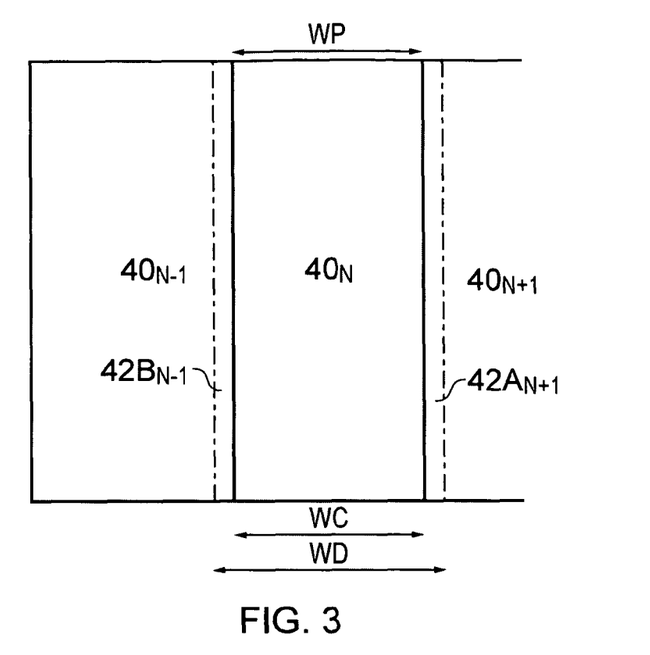
FIG. 3 illustrates an example, where pages of content are arranged in a sequence and can be presented in sequential order on the display.

The content 26 stored in the memory 24 may be arranged logically as pages. FIG. 3 illustrates an example, where pages $40_{N-1}$, $40_N$, $40_{N+1}$ are arranged in a sequence and can be presented in order on the display 12. In the example of FIG. 3, the first page $40_N$ of content is displayed on the central portion 14 of the display.

A rightmost edge portion $42B_{N-1}$ of the preceding page $40_{N-1}$ of content is displayed on the left curved side portion 14B of the display 12 in the elongate display strip 18B. A leftmost edge portion $42A_{N+1}$ of the following page $40_{N+1}$ of content is displayed on the right curved side portion 14A of the display 12 in the elongate display strip 18A.

Referring back to FIG. 1, the display controller 20 is configured to control simultaneously the central portion 14 of the display 12 to display at least a portion of a first page $40_N$ of content and the curved side portion 16A of the display 12 to display additional information $42A_{N+1}$ not forming part of the first page $40_N$ of content.

Figure 4:
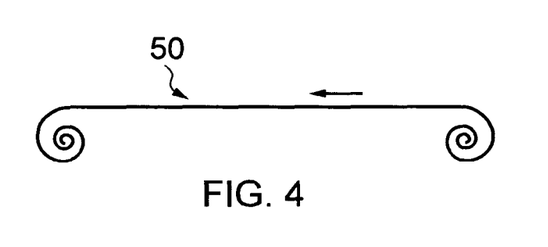
FIG. 4 schematically illustrates an example of scrolling content, as a series of pages, from the curved side portion of the display onto the central portion of the display.

As schematically illustrated in FIG. 4, the display controller 20 may be configured to scroll content, as a series of pages, across the curved side portion 16A of the display 12 onto the central portion 14 of the display 12. A user input 28 (FIG. 1) may be used to control the scrolling. For example, the content may be scrolled one page at a time. Each page when scrolled is centrally positioned in the central portion 14 of the display 12 but does not extend into the curved side portion 16A. However, a leftmost portion of the next page to be scrolled is previewed in the curved side portion 16A.

Figure 5:
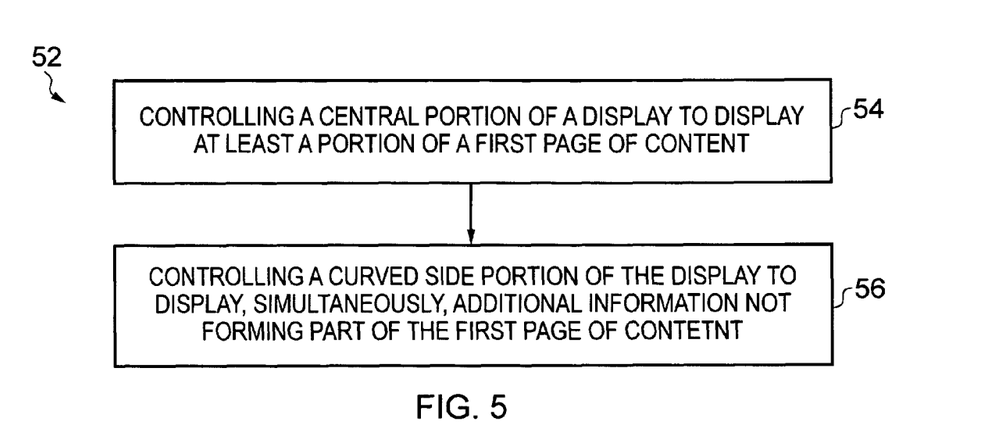

FIG. 5 schematically illustrates a method 52. At block 54, the display controller 20 is used to control a central portion 14 of a display 12 to display at least a portion of a first page of content.

At block 56, the display controller 20 is used to control a curved side portion 16A of the display 12 to display, simultaneously, additional information not forming part of the first page of content.

The additional information may provide a preview function for the next page of content.

In some embodiments, the display 12 may be a touch sensitive display and the display controller 20 may be capable of not only controlling the content of the display 12 but also be capable of detecting touch inputs by a user at the display 12.

At block 56, when the display controller 20 is used to control a curved side portion 16A of the display 12 to display, simultaneously, additional information not forming part of the first page of content, then the additional information may comprise control information displayed for touch actuation by a user. For example, it may define a selectable icon or element.

The display controller 20 may be configured to control incorrect touch input via the curved side portions 16A, 16B.

Figure 6A:
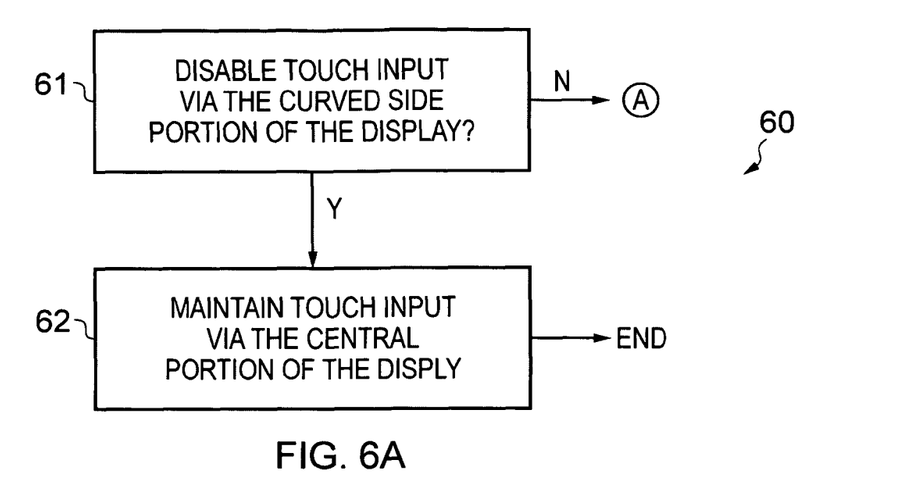
FIGS. 6A, 6B and 6C schematically illustrate examples of methods for controlling touch input via a curved side portion of a display.

FIG. 6A schematically illustrates a method 60 for controlling touch input via a curved side portion 16A. The display controller 20 disables touch input via the curved side portion 16A of the display 12 (block 61) while maintaining touch input at the central portion of the display 12 (block 62).

Figure 6B:
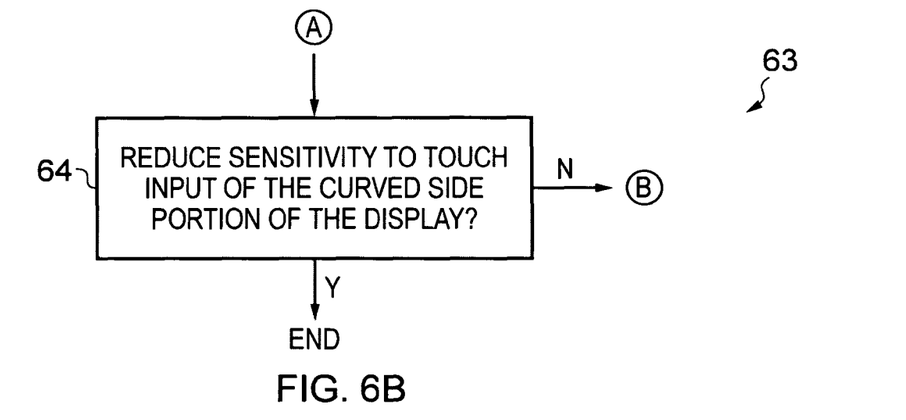

FIG. 6B schematically illustrates a method 63 for controlling touch input via a curved side portion 16A. The display controller 20 is configured to reduce a sensitivity to touch input of the curved side portion 16A of the display 12 (block 64).

Figure 6C:
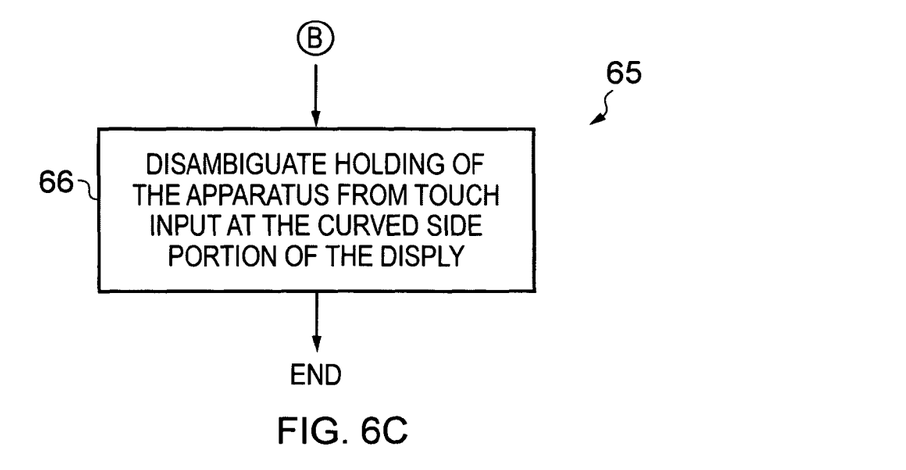

FIG. 6C schematically illustrates a method 65 for controlling touch input via a curved side portion 16A. The display controller 20 is configured to disambiguate holding from touch input at the curved side portion 16A (block 66).

Figure 7:
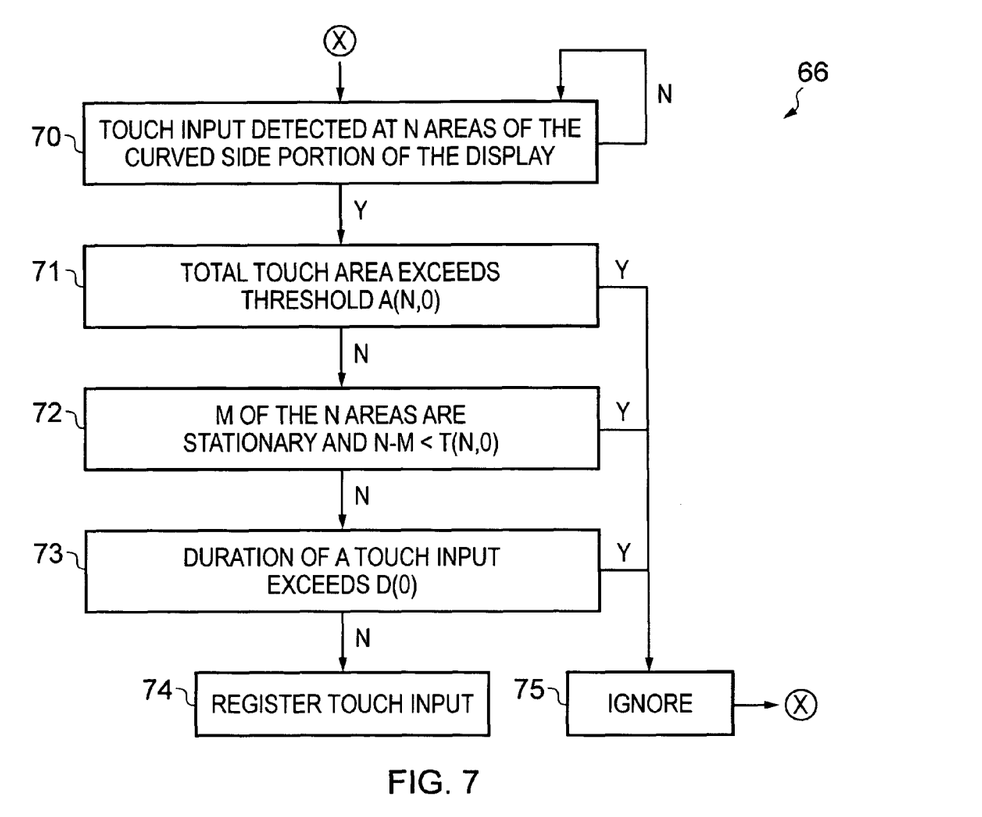
FIG. 7 schematically illustrates an example of a method for ignoring touch input at the curved side portion of a display.

FIG. 7 schematically illustrates a method 66 for controlling touch input via a curved side portion 16A. The display controller 20 is configured to ignore touch input at the curved side portion 16A in dependence upon one or more of: a duration of touch input; an orientation of the apparatus; an area of touch input; and a number of different locations of touch input.

At block 70, when touch input is detected at N (N>0) different areas of the curved side portion 16A, then the method 66 moves to block 71.

At optional block 71, if the total area of the curved side portion 16A that is touched at the N different areas of the curved side portion 16A exceeds a threshold A(N,O), then the method 66 moves to block 75 where the touch input at the curved side portion 16A is ignored. Otherwise, the method moves to block 72. The threshold A(N, O) is, in this example, a function of the number N of different areas where the curved side portion 16A is touched and also a function of an orientation of the apparatus 10. The orientation may, for example, be determined using a three-axis accelerometer which is arranged to measure gravity along three orthogonal axes. In other examples, the threshold may be a constant.

At optional block 72, if the N putative inputs at the N different areas of the curved side portion 16A are stationary or too many of them are stationary then the method 66 moves to block 73 otherwise the method moves to block 75 where the touch input at the curved side portion 16A is ignored. If M of the N putative inputs are stationary, then if N−M<T(N, O) the method moves to block 75. The threshold T(N, O) is, in this example, a function of the number N of different areas where the curved side portion 16A is touched and also a function of an orientation of the apparatus 10. The orientation may, for example, be determined using a three-axis accelerometer which is arranged to measure gravity along three orthogonal axes. In other examples, the threshold T may be a constant e.g. 1.

At optional block 73, if a duration of a touch input exceeds a threshold D(O) then the method 66 moves to block 75 where the touch input at the curved side portion 16A is ignored otherwise the method moves to block 74 where the touch input at the curved side portion 16A of the display 12 is registered. The threshold D(O) is, in this example, a function of an orientation O of the apparatus 10. The orientation may, for example, be determined using a three-axis accelerometer which is arranged to measure gravity along three orthogonal axes. In other examples, the threshold D may be a constant.

Implementation of display controller 20 can be in hardware alone (a circuit, a processor . . . ), have certain aspects in software including firmware alone or can be a combination of hardware and software (including firmware).

The display controller 20 may be implemented using instructions that enable hardware functionality, for example, by using executable computer program instructions in a general-purpose or special-purpose processor that may be stored on a computer readable storage medium (disk, memory etc) to be executed by such a processor.

Figure 8:
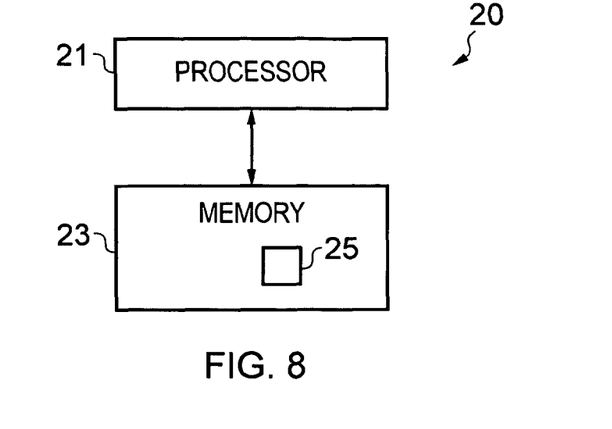
FIG. 8 schematically illustrates an example of how the display controller may be implemented.

FIG. 8 schematically illustrates an example of how the display controller 20 may be implemented. Other implementations are possible.

The display controller 20 comprises at least one processor 21; and at least one memory 23 including computer program code 25, the at least one memory 23 and the computer program code 25 configured to, with the at least one processor 21, cause the display controller 3 apparatus at 20 to perform the method of any of FIGS. 5, 6A, 6B, 6C and/or 7.

The processor 21 is configured to read from and write to the memory 23. The processor 21 may also comprise an output interface via which data and/or commands are output by the processor and an input interface via which data and/or commands are input to the processor 21.

The memory 23 stores a computer program 25 comprising computer program instructions that control the operation of the apparatus 10 when loaded into the processor 21. The computer program instructions 25 provide the logic and routines that enables the apparatus to perform the methods illustrated in FIGS. 3, 4, 6A, 6B, 6C and/or 7. The processor 21 by reading the memory 23 is able to load and execute the computer program 25.

The computer program may arrive at the apparatus 10 via any suitable delivery mechanism. The delivery mechanism may be, for example, a computer-readable storage medium, a computer program product, a memory device, a record medium such as a compact disc read-only memory (CD-ROM) or digital versatile disc (DVD), an article of manufacture that tangibly embodies the computer program 25. The delivery mechanism may be a signal configured to reliably transfer the computer program 25. The apparatus 10 may propagate or transmit the computer program 25 as a computer data signal.

Although the memory 23 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The display controller may be a module.

The blocks illustrated in the FIGS. 6A, 6B, 6C and 7 may represent steps in a method and/or sections of code in the computer program [ref]. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising a display comprising: a central portion and a curved side portion;
a memory storing pages of content; and
a display controller configured to control simultaneously the central portion of the display to display at least a portion of a first page of content and the curved side portion of the display to display additional information not forming part of the first page of content, wherein the display controller is configured to display the pages of content in the central portion in a sequential order, and the additional information provides a preview function for a next page of content of the sequential order, the additional information comprising a portion of the next page of content of the sequential order.

2. An apparatus as claimed in claim 1 wherein the display is a flexible display and wherein the curved side portion of the display is formed by flexing the flexible display.

3. An apparatus as claimed in claim 1, wherein the curved side portion of the display defines an elongate strip.

4. An apparatus as claimed in claim 1, wherein the curved side portion of the display forms at least part of a side edge of the apparatus.

5. An apparatus as claimed in claim 1, wherein the display controller is configured to scroll content across the curved side portion of the display onto the central portion of the display.

6. An apparatus as claimed in claim 1, wherein the display controller is configured to scroll content page by page, across the curved side portion of the display onto the central portion of the display.

7. An apparatus as claimed in claim 1, wherein the display is a touch sensitive display.

8. An apparatus as claimed in claim 7, wherein the additional information comprises control information displayed for touch actuation.

9. An apparatus as claimed in claim 7, wherein the display controller is configured to control incorrect touch input via the curved side portion.

10. An apparatus as claimed in claim 7, wherein the display controller is configured to disable touch input via the curved side portion of the display while maintaining touch input at the central portion of the display.

11. An apparatus as claimed in claim 7, wherein the display controller is configured to reduce a sensitivity to touch input of the curved side portion of the display.

12. An apparatus as claimed in claim 7, wherein the display controller is configured to disambiguate holding from touch input at the curved side portion.

13. An apparatus as claimed in claim 12, wherein the display controller is configured to ignore touch input at the curved side portion in dependence upon one or more of: a duration of touch input; an orientation of the apparatus; an area of touch input; and a number of different locations of touch input.

14. A method comprising: controlling a central portion of a display to display at least a portion of a first page of content, the first page of content being one of a plurality of pages of content to be displayed within the central portion in a sequential order; and
controlling a curved side portion of the display to display, simultaneously, additional information not forming part of the first page of content to provide a preview function for a next page of content of the sequential order, wherein the additional information comprises a portion of the next page of content of the sequential order.

15. A method as claimed in claim 14 comprising detecting touch input at the central portion of the display and controlling the detection of touch input via the curved side portion of the display.

16. An apparatus comprising: at least one processor; and at least one memory including computer program code
the at least one memory and the computer program code configured to, with the at least one processor, cause the apparatus at least to perform:
controlling a central portion of a display to display at least a portion of a first page of content, the first page of content being one of a plurality of pages of content to be displayed within the central portion in a sequential order; and
controlling a curved side portion of the display to display, simultaneously, additional information not forming part of the first page of content, wherein the additional information provides a preview function for a next page of content of the sequential order, the additional information comprising a portion of the next page of content of the sequential order.

17. A display controller configured to control simultaneously a central portion of a display to display a first page of content and a curved side portion of the display to display additional information not forming part of the first page of content, wherein the first page of content is one of a plurality of pages of content, the display controller is configured to display the plurality of pages of content in the central portion in a sequential order, and the additional information provides a preview function for a next page of content of the sequential order, the additional information comprising a portion of the next page of content of the sequential order.

18. An apparatus as claimed in claim 1 wherein the additional information comprises a leftmost edge portion of the next page of content.

19. An apparatus as claimed in claim 1 wherein the curved side portion is a first curved side portion and the display has a second curved side portion, the central portion being arranged between the first curved side portion and the second curved side portion, and wherein the display controller is configured to simultaneously control the second side portion to display a portion of a previous page of content of the sequential order while controlling the first side portion to display the portion of said next page.

20. A method as claimed in claim 14 wherein the curved side portion is a first curved side portion and the display has a second curved side portion, the central portion being arranged between the first curved side portion and the second curved side portion, and wherein the method comprises simultaneously controlling the second side portion to display a portion of a previous page of content of the sequential order while controlling the first side portion to display the portion of said next page.

\* \* \* \* \*